Figure 1:
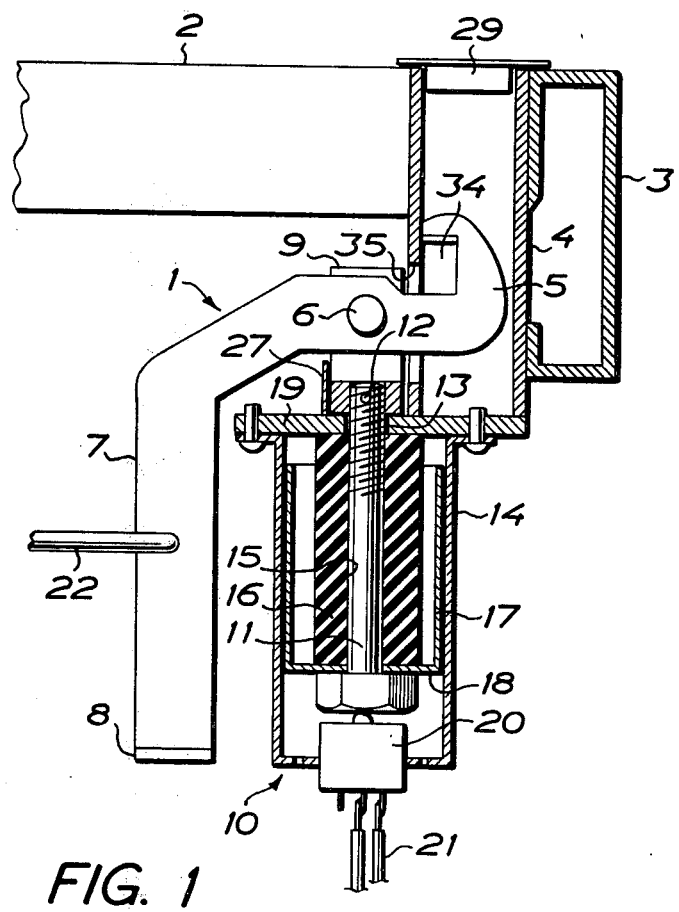

United States Patent [19]

Sunesson

[11] 4,247,235

[45] Jan. 27, 1981

[54] TENSIONING BAND FASTENING DEVICE

[76] Inventor: Karl G. Sunesson, Alstervägen 11, S-360 73, Lenhovda, Sweden

[21] Appl. No.: 889,102

[22] Filed: Mar. 22, 1978

[30] Foreign Application Priority Data

Mar. 21, 1977 [SE] Sweden .............................. 7703189

[51] Int. Cl.³ .......................... B60P 7/08; B60P 7/16; B61D 45/00
[52] U.S. Cl. .................... 410/106; 24/238; 200/52 R; 200/61.44; 410/100; 410/103
[58] Field of Search .................. 24/238; 105/466, 473, 105/474, 475, 476, 477, 478, 479, 480, 481, 482, 483, 484, 485; 248/500, 501, 179 A; 200/52 R, 61.18, 61.44, 61.58 B; 410/100, 103, 106

[56] References Cited

U.S. PATENT DOCUMENTS 3,312,181  4/1967  Davidson .................... 105/475 X
3,357,670  12/1967  Larsen .................... 105/475

Primary Examiner—Howard Beltran

[57] ABSTRACT

A device for fastening the free end of a tensioning band for securing loads to a loading platform on a truck by a tensioning band and a tensioning device. The fastening device comprises a sleeve having a hook which engages a D ring attached to the free end of the band. The hook is pivotably and resiliently attached to the sleeve and is remotely operated by an operating device. When the tensioning force in the band exceeds a predetermined value, which is determined by the spring, a switch is actuated by the spring and making a monitoring lamp positioned in the truck cabin to go out. The operating device can be a stay extending transversally from the fastening device and beneath the platform to the corresponding tensioning device, or a pneumatic, hydraulic or an electromechanic device operated from the corresponding tensioning device and/or from the truck cabin.

9 Claims, 7 Drawing Figures

TENSIONING BAND FASTENING DEVICE

The present invention relates to a device for securing loads to a loading platform on a truck by means of a tensioning band and a tensioning device and more particularly it relates to an improved device for fastening the free end of the tensioning band to the platform or the frame.

A device of this kind, a tensioning device, consists of a drum holding means disposed at one longitudinal side of a truck platform, a latchable winding drum, a tensioning band which may be wound around the drum and means for fastening the free end of the tensioning band to the other longitudinal side of the platform opposite the tensioning device.

The present fastening means generally consists of a hook attached to the loading platform and a so-called D ring which is attached to the end of the tensioning band. Alternatively, a sleeve may be provided in the loading platform into which sleeve the said D ring is introduced and in which it is locked by means of a pin.

The fastening means is used in such a way that the tensioning band is pulled out from its storage position on the drum and is thrown over the load so as to fall down at the outer side of the loading platform. The truck driver then walks around the platform and secures the D ring in the corresponding fastening means and returns to the tensioning device in order to impart to the band a certain preload by means of the winding drum. The latching means prevents the bands from going slack. A suitable tension in the tensioning bands is 1350 to 1800 pounds force.

Thereafter the driver passes around the platform and detaches the D ring from its fastening means and returns to the tensioning device in order to wind the band onto the winding drum.

This makes it necessary for the truck driver to pass back and forth around the truck several times and there is consequently a need for reducing the number of movements.

However, when piece goods are transported, the load will as a rule settle slightly, for instance because of shaking or due to swaying movements. In that case, one or more of the tensioning bands may go slack and will consequently lose its tightening action. It is consequently desirable to indicate whether the band is under tension.

The above problem is solved according to the present invention by providing a novel fastening means whose locking mechanism may be remotely controlled and which is provided with a device indicating band tension.

Figure 2:
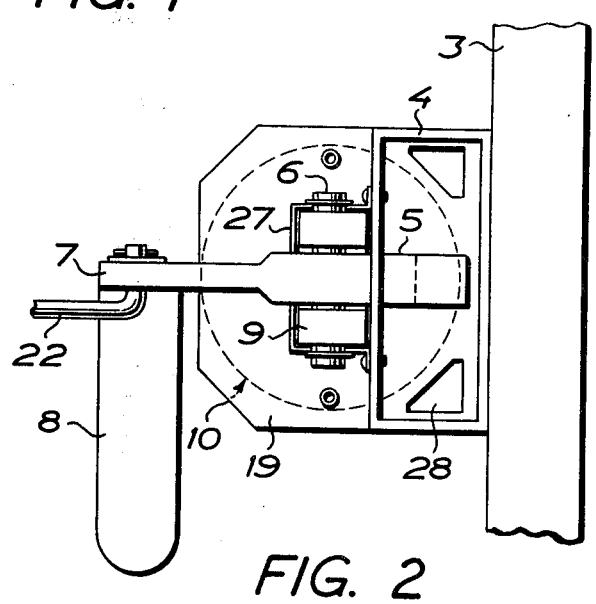
Figure 3:
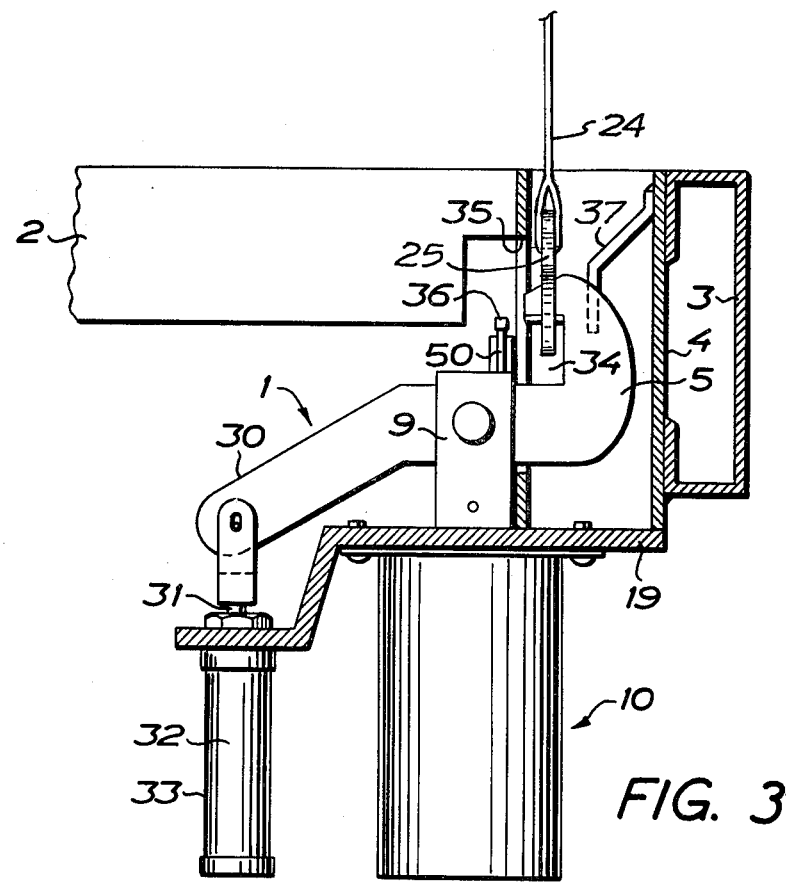
Figure 4:
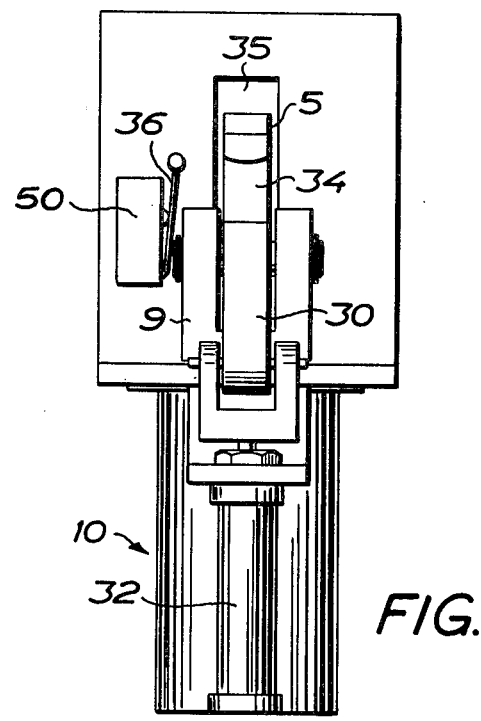
Figure 5:
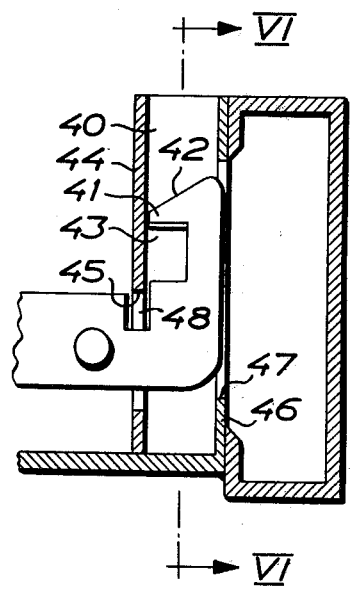
Figure 6:
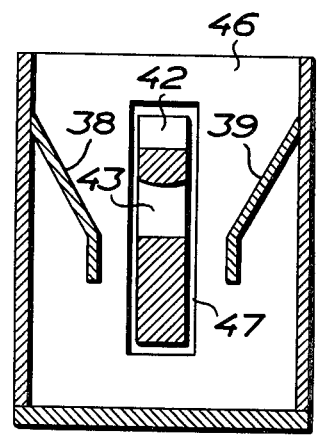
Figure 7:
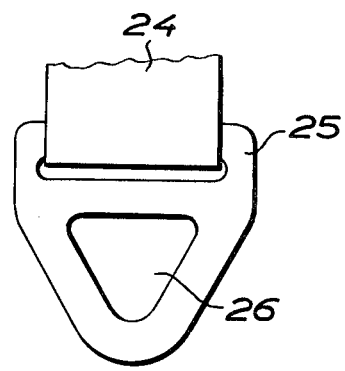

In order to explain the invention in more detail preferred embodiments of the fastening device according to the invention are described below with reference to the accompanying drawings, in which FIG. 1 is a cross section through a first embodiment of the fastening device according to the invention, FIG. 2 is a plan view of the fastening device according to FIG. 1, FIG. 3 shows a second embodiment of the fastening device according to the invention, FIG. 4 shows an elevation of the second embodiment, FIG. 5 shows a third embodiment of the fastening means according to the invention, and FIG. 6 shows an elevation of the third embodiment, FIG. 7 shows the face end of the band provided with a D ring.

The fastening device 1 shown in FIG. 1 is secured to a loading platform 2 immediately inside the side beam 3. The fastening device comprises a sleeve 4 which is welded to the side beam 3 and a hook 5 is journalled on a shaft 6 and which ends in a lever 7 and a handle 8. The shaft 6 is secured to a forklike bracket 9, which is attached via a spring device 10 to the sleeve 4. The spring device 10 comprises the fork bracket 9, which is secured to a bolt 11 by means of a locking screw 12 or a locking pin. The bolt is moved downwardly through an opening 13 in the casing 14 of the spring device and through a centrally located opening 15 in a cylindrical "urelast" spring 16. The spring 16 is in turn surrounded by a spacing sleeve 17 of metal through the end wall 18 of which said bolt extends. The spring 16 is consequently clamped between the end wall 18 of the spacing sleeve and the end wall 19 of the casing 14 with a certain predetermined bias. The said bias may be adjusted by means of the bolt 11. At the lower end of the bolt there is provided a micro switch 20 with conduits which is in its actuated position. Furthermore, a stay 22 is secured to the lever 7, said stay extending beneath the platform 2 to a tensioning device (not shown) located at the opposite side. The tensioning band 24 ends in a so called D ring 25 having an aperture 26 (see FIG. 6).

The fastening device functions in the following manner. The initial position is shown in FIG. 1. The D ring is introduced into the sleeve 4 into abutment with the hook 5. When the D ring is pressed further down, the hook 5 is rotated around its shaft 6. The rotational movement is counteracted by the weights of the lever 7 and the handle 8. Space 34 in the hook 5 is thereby opened, whereupon the aperture 26 of the D ring can be introduced into the space. The hook 5 may then be snapped back into its initial position with the D ring fastened between the hook 5 and the lateral wall of the sleeve 4. If tension is exerted in the band 24, the D ring will exert an upwardly directed force on the hook, said hook tending to rotate counterclockwise into the groove 35 of the sleeve 4. As a result of this, the D ring 25 is pressed against the lateral wall of the sleeve 4, the D ring being retained still more securely.

The tension force exerted by the tensioning band 24 and the D ring 25 onto the hook 5 is transmitted to the spring means 10 via the shaft 6, the fork bracket 9, the bolt 11 and the spacing sleeve 17. The spring 16 has been given a bias by means of the bolt 11 said bias corresponding for instance to a tensioning force of 1350 pounds in the band. If the tensioning force in the band is below this value the fork bracket is in its initial position abutting the end wall 19 of the spring casing, the micro switch 20 being activated. If the tension force in the tensioning band increases, the fork bracket and the bolt will become displaced slightly upwards under simultaneous compression of the spring 16. During that movement the fork bracket is guided in separate guiding means 27. When this movement is performed the micro switch is deactivated. If the tension force in the tensioning band is increased still more, the spring 16 will be compressed to such a degree that the spacing sleeve 11 comes into contact with the end wall 19 of the spring casing 14, which takes place when there is a tension force of for instance 1800 pounds in the tensioning band. When the tension force in the tensioning band increases still further, no additional displacements will take place.

The micro switch 20 is connected via the conduits 21 to a monitoring lamp which may be located for instance on the dashboard in the truck cabin, said lamp being alight when the micro switch is activated. The lamp goes out when the tensioning force in the band is in excess of 6 kN.

When the load is to be unloaded the latching means of the tensioning device is first loosened. Thereupon the D ring is loosened by pulling the stay 22 extending beneath the platform from the tensioning device to the lever 7. This removes the drawback of having the driver pass back and forth around the truck during the unloading operation. The D ring may also be loosened by means of the handle 8.

The sleeve 4 is provided at its bottom with drainage openings 28 for draining rain water. When the fastening device is not in use the sleeve should preferably be covered by a plastic lid 29.

A person skilled in the art will realize that different types of compression springs may be used instead of the "urelast" spring 16. Thus, a cylinder spring of spring steel or other resiliently compressible materials may be used. Furthermore, the micro switch 20 may be replaced by other conventional switch means.

FIG. 3 shows a second embodiment of the fastening device according to the present invention. The construction is largely similar to the one described above but differs therefrom inter alia with respect to the remote control of the hook 5 and the location of the micro switch. The lever 7 has been replaced by a shorter lever 30 to which the plunger 31 of the pneumatic cylinder 32 is attached. The cylinder casing 33 is secured to the sleeve 4 and the spring casing 14. When activating the pneumatic cylinder 32, the plunger 31 is pressed out of the cylinder in order to rotate the hook 5 clockwise, the D ring being loosened from the hook. The pneumatic cylinder is provided with an interior return spring (not shown) which provides that the hook 5 is spring biased against its locking position.

The operating power for the pneumatic cylinder is taken from the pneumatic system which exists in most trucks. The fastening means may be opened either from a central operating device for all fastening means provided in the driver's cabin or in another suitable place, or separately by control means provided at the corresponding tensioning device. The pneumatic cylinder may also be replaced by a hydraulic cylinder or an electromagnetic device, if desired.

Furthermore, the micro switch 50 is located in such a way that it will be activated by the fork means 9, as is best shown in FIG. 4. In this embodiment the "urelast" spring 16 is only biassed by 112 pounds. The spacing sleeve 17 is slightly shorter in order to permit a larger movement in the fork device. The spacing sleeve 17 reaches the end wall 19 when there is a tensioning force of about 1350 pounds in the band. When the tensioning band is tightened the fork bracket 9 is displaced upwardly and presses the operating arm 36 of the micro switch 50 to the left as viewed in FIG. 4 when a predetermined tensioning force is applied. In that connection the corresponding monitoring lamp goes out in order to indicate that the tensioning band is under tension. The said predetermined tensioning force at which the micro switch is actuated is dependent on the location of the micro switch in the vertical sense and the location of the micro switch may be changed in dependence on the load to be transported.

Furthermore, this second embodiment is provided with a guiding plate 37 in order to guide the D ring into cooperation with the hook at the introduction of the D ring into the sleeve.

This sleeve 4 may also be provided with guiding plates 38, 39 for lateral guiding of the D ring, as is shown in FIGS. 5 and 6. In the said third embodiment the sleeve 40 is made more narrow. Furthermore, the hook 41 is modified and is provided with an oblique upper cam surface 42, which causes the D ring to be guided towards the opening 43 of the hook when the hook is rotated through a slot 41 in a side wall 46 of sleeve 40. Furthermore, the side wall 44 of the sleeve facing the hook has an opening with upper edge 45 with which the hook cooperates in such a way that when the tensioning band pulls the hook and the spring means upwardly, a notch 48 in the hook engages upper edge 45 and the side wall 44 of the sleeve. This prevents the hook from getting loose.

The switch means may be connected in several different ways in order to indicate that the corresponding band is under correct tension. Thus, the switching means of a plurality of fastening devices may be connected in series and be connected to one common monitoring lamp on the dashboard of the truck, which is dark when all tensioning bands are under the correct tension and which will be lit as soon as one or more of the tensioning bands become loosened. Preferably, there is also provided an individual monitoring lamp at each tensioning device so that the truck driver may decide from the tensioning device when the band has been tensioned sufficiently.

Fastening means according to the present invention provides inter alia the advantages mentioned by way of introduction. Furthermore, a certain resiliency is obtained in the attachment of the tensioning band, which is advantageous when the truck is driven along a rutty road since in that case the load is not secured to the loading platform in such a way that it cannot move at all. In order to provide the securing means somewhat inside the side member an additional advantage is obtained, viz. that the load is supported laterally from the platform surface.

The above embodiment has only been described for the purpose of illustrating the invention without limiting it in any manner except by the following claims.

What I claim is:

1. A fastening device for fastening one end of a load tensioning band, said fastening device comprising:
   a sleeve having a first and second opening, the first opening being arranged to receive an end of the load tensioning band;
   a spring means coupled to said sleeve;
   a hook member pivotably connected to said spring means, said hook member having a movable band-engaging end extending through the second opening in said sleeve and positioned within said sleeve for releasably retaining the end of the load tensioning band, said member being pivotable to move said band-engaging end from a retaining position to a releasing position, said spring means biasing said hook member in a first direction and allowing limited movement of said hook member relative to said sleeve in response to a tension force applied through the load tensioning band; and
   switch means coupled to said sleeve and said hook member, said switch means being actuated as a result of movement of said hook member relative to said sleeve in response to the application of a force greater than a predetermined tension force.

2. The fastening device as claimed in claim 1, wherein said spring means includes a forked bracket through which said hook member is pivotably mounted.

3. The fastening device as claimed in claim 1, wherein said hook member includes an open hook at said band-engaging end, said open hook facing a wall of said opening in said sleeve, said open hook being moved toward said wall as said band-engaging end is pivoted from said releasing position to said retaining position such that an end of a load tensioning band engaged by said hook is captured between said band-engaging end of said hook member and said wall of said sleeve, tension applied to said band-engaging end of said hook member tending to pivot said hook member toward said retaining position.

4. The fastening device as claimed in claim 1, wherein said hook member is pivotably connected to said spring means at a point remote from the ends of the hook member, and further comprising operating means coupled to said hook member at a point remote from said band-engaging end and said pivot, said operating means pivoting said hook member between said retaining position and said releasing position.

5. The fastening device as claimed in claim 4, wherein said operating means includes a manually engageable handle remote from said hook member and linkage means coupling said handle to said hook member.

6. The fastening device as claimed in claim 4, wherein said operating means includes a fluid actuated cylinder and means for actuating said cylinder from a remote location.

7. The fastening device as claimed in claim 1, 3, 4, 5, or 6, further comprising means for biasing said hook member toward said retaining position.

8. The fastening device as claimed in claim 3, wherein said band-engaging end of said hook member includes a cam surface adjacent said open hook for cooperating with the end of a load tensioning band inserted in said sleeve such that said hook member is moved toward said releasing position to allow insertion of the end of the load tensioning band into said open hook.

9. The fastening device as claimed in claim 3, further including guide surfaces within said opening for guiding the end of a load tensioning band inserted in said opening toward said open hook.

* * * * *